US006843114B2

United States Patent
Pradier et al.

(10) Patent No.: US 6,843,114 B2
(45) Date of Patent: Jan. 18, 2005

(54) WHEEL ARRANGEMENT HAVING A PRESSURE SENSOR

(75) Inventors: Jean-Clair Pradier, Houilles (FR); Antoine Gautier, Saint Cloud (FR)

(73) Assignee: Messier-Bugatti, Velizy Villacoublay (FR)

( * ) Notice: Subject to any disclaimer, the term of this patent is extended or adjusted under 35 U.S.C. 154(b) by 0 days.

(21) Appl. No.: 10/478,720

(22) PCT Filed: May 24, 2002

(86) PCT No.: PCT/FR02/01758

§ 371 (c)(1),
(2), (4) Date: Apr. 16, 2004

(87) PCT Pub. No.: WO02/096681

PCT Pub. Date: Dec. 5, 2002

(65) Prior Publication Data

US 2004/0173014 A1 Sep. 9, 2004

(30) Foreign Application Priority Data

May 31, 2001  (FR) .......................................... 01 07182

(51) Int. Cl.⁷ .............................................. B60C 23/02
(52) U.S. Cl. ................................................... 73/146.5
(58) Field of Search .............................. 73/146, 146.2, 73/146.3, 146.5; 340/442–448

(56) References Cited

U.S. PATENT DOCUMENTS

| 5,033,295 A | | 7/1991 | Schmid et al. |
| 5,587,698 A | * | 12/1996 | Genna ........................ 340/442 |
| 5,969,239 A | * | 10/1999 | Tromeur et al. ........... 73/146.5 |

FOREIGN PATENT DOCUMENTS

FR          2 665 417         2/1992

* cited by examiner

Primary Examiner—William Oen
(74) Attorney, Agent, or Firm—Young & Thompson

(57) ABSTRACT

A wheel arrangement includes a wheel having a sensor for measuring pressure in the tyre; a spindle, about which the wheel is rotatably mounted with the aid of bearings around the spindle, and of communication elements between the sensor and elements for using measures, which are associated with the spindle. Communication elements are adapted to a transmission system with a frequency higher than 50 kHz comprising a rotating antenna which is supported by the wheel and a fixed antenna. The two antennae do not have their own rotational guiding element. The antennae are generally annular and disposed in a concentric manner on the same level around the wheel axis (X-X) of rotation, the average radial distance between the antennae exceeding 2 mm.

8 Claims, 1 Drawing Sheet

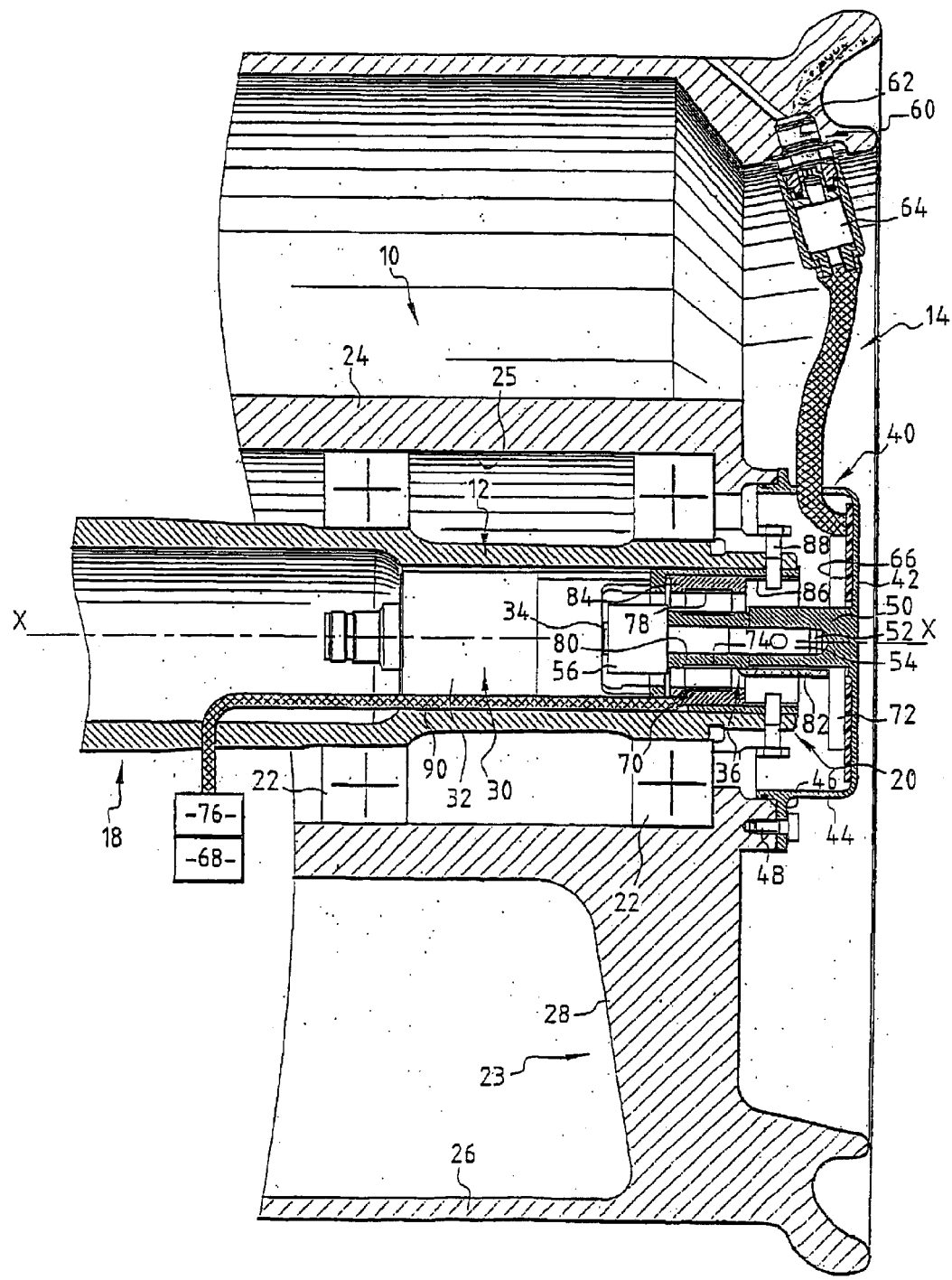

WHEEL ARRANGEMENT HAVING A PRESSURE SENSOR

"This application is a 371 of PCT/FR02101758 filed May 24/2002."

The present invention relates to a wheel arrangement, of the type comprising:

- a wheel provided with a rim which is suitable for receiving a tyre, the wheel carrying a sensor for measuring the pressure in the tyre;
- a spindle about which the wheel is rotatably mounted by means of bearings; and
- means of communication between the sensor and means, associated with the spindle, for using the measurements carried out by the sensor.

In aeroplanes, it is useful to know from the cockpit the tyre pressures of the landing gear wheels.

For that purpose, it is known to mount on the wheel rim a pressure sensor suitable for measuring the inflation pressure of the tyre carried on the rim. This pressure sensor sends the value of the measurement carried out to a data-processing unit located on the fixed part of the landing gear or in the body of the aeroplane.

Accordingly, it is necessary to provide means for communicating data between the fixed parts and the mobile parts of the landing gear.

In particular, it is known to arrange on the hub of the wheel and on the spindle of the wheel, about which the hub is rotatably mounted, two concentric windings which together constitute a transformer. The winding carried by the hub is connected to the pressure sensor while the winding carried by the wheel spindle is connected to the data-processing unit.

The signal which is delivered by the sensor to the winding carried by the hub and which corresponds to the value of the pressure in the tyre induces a signal in the winding carried by the landing gear spindle. This signal is analyzed by the data-processing unit in order to deduce therefrom the pressure in the tyre.

The frequency of the signal circulating in the windings of the transformer is approximately 3 kHz. In order to ensure satisfactory data transmission between the two windings, the radial distance between the concentric windings has to be as small as possible. This distance is, for example, of the order of 0.3 mm. In any case, the distance must be less than 1 mm.

In order to provide for such a distance, over the entire circumference of the windings, it is advantageous for the two windings to comprise their own means for guidance in rotation, such as two ball bearings.

Such a layout is described, for example, in the document FR-2.665.417.

In this layout, the wheel arrangement comprises, on the one hand, two ball bearings which ensure the rotation of the wheel around the wheel spindle and, on the other hand, two other additional ball bearings permitting satisfactory radial positioning of the two windings relative to one another.

The presence of the additional ball bearings, which ensure that the two windings are centered, considerably increases the complexity of the wheel arrangement and makes it difficult to arrange an auxiliary device, such as a device for monitoring the rotation of the wheel, inside the wheel spindle.

The object of the invention is to provide a solution to this problem by proposing a wheel arrangement which is mechanically simple and, in particular, enables an auxiliary device to be readily accommodated inside the wheel spindle while at the same time permitting data transmission between the wheel and the fixed part supporting the wheel by a reliable and compact layout.

To that end, the invention relates to a wheel arrangement of the above-mentioned type, characterized in that the communication means are suitable for radiofrequency transmission at a frequency higher than 50 kHz and comprise a rotating antenna carried by the wheel and a fixed antenna carried by the spindle, the two antennae not having their own means of guidance in rotation, and in that the rotating antenna and the fixed antenna are generally annular and are located in the same plane in a concentric manner about the axis of rotation of the wheel, the average radial distance between the rotating antenna and the fixed antenna exceeding 2 mm.

According to particular embodiments, the wheel arrangement comprises one or more of the following features:

- the average radial distance between the rotating antenna and the fixed antenna is substantially equal to 5 mm;
- the fixed antenna extends around the rotating antenna;
- the arrangement comprises an auxiliary device located inside the wheel spindle;
- the auxiliary device comprises a rotary member and it comprises means for the connection in rotation of the rotary member and the wheel, which means extend generally along the axis of rotation of the wheel, through the rotating antenna and the fixed antenna;
- the means for connection in rotation comprise a rotating core which is fixedly joined to the wheel and which is engaged through the spindle, and the rotating antenna is carried by the rotating core and is fixed for rotation therewith;
- the connecting means comprise a mechanism for coupling in rotation the wheel and the rotary member of the auxiliary device, which coupling means are suitable for compensating for any axial offsetting between the wheel and the rotary member; and
- the auxiliary device comprises a tachometer.

The invention will be better understood on reading the following description which is given purely by way of example with reference to the single FIGURE which is a view in longitudinal section of a wheel arrangement according to the invention, the tyre not having been shown.

The wheel arrangement 10 represented in FIG. 1 forms part of the landing gear of an aeroplane. It comprises a landing gear spindle 12 constituting a fixed part and a wheel 14 which is mounted rotatably about the axis X-X of the spindle.

The spindle 12 has a generally tubular hollow body 16 having an axis X-X. The body 16 is connected at one end 18 to the remainder of the structure of the landing gear. The other end, marked 20, of the body 16 forms a free end of the spindle.

The wheel 14 is rotatably mounted about the spindle 12 by means of two roller bearings 22 which are spaced along the axis of the spindle.

The wheel 14 comprises a rim 23 on which a tyre (not shown) is mounted. The rim 23 comprises a hub 24 traversed from one side to the other by a passage 25 in which the spindle 12 and the two bearings 22 extend.

The rim 23 also comprises an outer ring 26 for supporting the tyre. The hub 24 and the ring 26 are connected to one another by radial arms 28 which are separated from one another by ventilation louvres.

An auxiliary device 30 is located inside the spindle 12. This device 30 is, for example, a tachometer which is to monitor the rotation of the wheel. This device comprises a body 32 which is fixedly joined to the spindle 12, and a portion 34 which is mobile in rotation relative to the body. The mobile portion is fixed for rotation with the wheel 14 by a mechanical train 36 which extends axially through the free end 40 of the spindle.

The train 36 comprises, for example, a dish-like member 40 forming a cap mounted on the rim 23 along the axis thereof.

The dish-like member 40 has a base 42 surrounded by a generally cylindrical lateral wall 44. The lateral wall has, at its open end, an outer peripheral flange 46 enabling the dish-like member 40 to be connected to the rim 23 by means of screws 48.

The axis of the dish-like member 40 extends generally along the axis X-X of rotation of the wheel. The dish-like member 40 comprises an axial bush 50 facing the spindle. The bush has a fluted hole 52 capable of receiving a fluted rod 54 extending along the axis X-X. The free end of the fluted rod 54 can be connected to the mobile portion 34 of the device 30 for monitoring the rotation of the wheel, by way of a mechanism 56 for coupling in rotation which is able to compensate for any axial offsetting between the axis of rotation of the mobile portion 34 of the tachometer and the axis of rotation of the wheel 14, of the dish-like member 40 and of the fluted rod 54.

The mechanism 56 is constituted, for example, by a rubber plug which is fixedly joined, on the one hand, to the mobile portion 34 and, on the other hand, to the threaded rod 54.

A pressure sensor 60 is mounted on the wheel. For that purpose, and as known per se, the ring 26 of the wheel is provided with a housing 62 which receives a pressure probe 64 suitable for measuring the pressure inside the tyre of the wheel. The sensor 60 also comprises a module 66 for processing the signal and for controlling the probe. This module is connected to the probe 64.

The module 66 is formed on a printed circuit which is fixedly joined to the base of the dish-like member 40 around the bush 50.

A data-processing unit 68 is fixedly joined to the fixed part of the landing gear or to the body of the aeroplane. It is suitable for using and, in particular, displaying the pressure measurements carried out by the sensor 60.

The sensor 60 and the data-processing unit 68 are connected to one another by communication means marked by the general reference 70. These communication means are suitable for providing radiofrequency transmission, that is to say, by radio, between the sensor 60 and the data-processing unit 68. This transmission is bidirectional, that is to say, each entity can send and receive data.

These communication means are suitable for transmitting by radio the electric energy necessary for the functioning of the sensor 60.

To be more precise, the communication means 70 comprise a unit 72 for the modulation/demodulation of the signal, which unit 72 is carried by the wheel 14. This unit, which is suitable for shaping the signal, is connected, on the one hand, to the processing module 66 of the sensor 60 and, on the other hand, to a rotating antenna 74 which is fixedly joined to the wheel.

The modulation/demodulation unit 72 is formed on the same printed circuit carried by the dish-like member 40 as the processing module 66 of the sensor.

Analogously, the communication means 70 comprise a unit 76 for the modulation/demodulation of the signal, which unit 76 is carried by the spindle 12 and is connected to the data-processing unit 68. The unit 76 is connected to a fixed antenna 78 carried by the spindle 12.

The antennae 74 and 78 are suitable for the transmission and reception of radiofrequency signals. These signals advantageously have a frequency higher than 50 kHz and preferably of from 125 kHz to 2.2 GHz.

The antennae 74 and 78 are located opposite one another in such a manner as to provide radio communication between the mobile and fixed parts of the wheel arrangement.

According to the invention, and as illustrated in the FIGURE, the rotating antenna 74 and the fixed antenna 78 are generally annular and have an axis X-X. They are arranged concentrically about the axis X-X and are arranged in the same plane transverse to the axis X-X.

The rotating antenna 74 is provided on a support sleeve 80 engaged around the threaded rod 54. The sleeve 80 is fixed for rotation with the dish-like member 40 and the rim 23. For that purpose, the screw rod 54 compresses the support sleeve 80 axially against the bush 50.

The antenna 74 is formed, for example, by a conductor defining a helix at the surface of the support sleeve 80, the turns of the helix being non-contiguous. The conductor is formed, for example, by a printed circuit strip.

A sheathed conductor 82 connects the rotating antenna 74 to the printed circuit defining the modulation/demodulation unit 72.

The fixed antenna 78 is arranged around the rotating antenna 74. The antenna 78 is carried by the inner surface of a support ring 84. The ring 84 has a connecting collar 86 ensuring that the ring is fixedly joined axially and in rotation to the body of the spindle 12 by means of screws 88.

Like the rotating antenna 74, the fixed antenna 78 is formed by a conductor wound in a helix having non-contiguous turns, this conductor being carried by the ring 84.

The antenna 88 is connected to the modulation/demodulation unit 76 by a sheathed conductor 90 extending along the body of the tachometer 30.

The average radial distance between the antennae 74 and 78 is greater than 2 mm and is, for example, substantially equal to 5 mm.

This distance is suitable for compensating for any axial offsetting between the axis of rotation of the rod 54 carrying the antenna 74 and the axis of the spindle 12. Accordingly, any risk of collision between the two antennae 74 and 78 is avoided even though the two antennae do not have their own means for guidance in rotation relative to one another.

In order to carry out a pressure measurement, the data-processing unit 68 causes the unit 76 to transmit a modulated signal from the fixed antenna 78 to the rotating antenna 74. This signal carries data enabling the sensor 60 to be actuated. The signal also transmits the energy necessary to supply the unit 72 and the sensor 60.

The high frequency of the signal permits data transmission despite the relatively great distance between the two antennae.

The signal received by the rotating antenna 74 is demodulated by the unit 72 and is sent to the sensor 60. Under the control of the module 66, the sensor sends in return to the modulation/demodulation unit 72 the result of the measurement carried out by the probe 64. The signal shaped by this unit 72 is then transmitted by the rotating antenna 74 and received by the fixed antenna 78. The signal received is sent to the data-processing unit 68 in order to be used.

It will be appreciated that the use of radiofrequency communication means reduces the general bulk of the wheel arrangement. In addition, the concentric arrangement of the complementary antennae enables them to be arranged optimally close to one another in a compact manner. Because the antennae do not have their own centring means, the tachometer and the two antennae are able to co-exist in the spindle. Since the rotating antenna 74 is carried by the mechanical train 36 for connecting the wheel 14 and the tachometer 30 in rotation, the presence of the antenna does not complicate the arrangement of the hub.

Furthermore, since the antennae are located behind the dish-like member 40, they are protected from mechanical disturbance and surrounding electromagnetic interference.

Finally, because the two antennae are rotation-invariant and are arranged coaxially along the axis of rotation of the wheel, they are always directed towards one another, constantly presenting the same opposing surfaces. Accordingly, transmission quality is not modified by the rotation of the wheel.

It will be appreciated that the layout described here permits transmission between a pressure sensor and a fixed unit for using the results, while at the same time enabling the manufacturing and assembly tolerances of the various parts of the wheel arrangement to be compensated for. The two complementary antennae, owing to their relatively large spacing, which is made possible by the high transmission frequency, may be located on the mechanical members capable of driving the auxiliary device.

By way of variation, the auxiliary device placed in the spindle is not a tachometer but is constituted by a brake vent.

What is claimed is:

1. Wheel arrangement (10) comprising:
   a wheel (14) provided with a rim (23) which is suitable for receiving a tyre, the wheel (14) carrying a sensor (60) for measuring the pressure in the tyre;
   a spindle (12) about which the wheel (14) is rotatably mounted by means of bearings (22); and
   means (70) of communication between the sensor (60) and means (86), associated with the spindle, for using the measurements carried out by the sensor (60), characterized in that the communication means (70) are suitable for radiofrequency transmission at a frequency higher than 50 kHz and comprise a rotating antenna (74) carried by the wheel (14) and a fixed antenna (78) carried by the spindle (12), the two antennae (74, 78) not having their own means of guidance in rotation, and in that the rotating antenna (74) and the fixed antenna (78) are generally annular and are located in the same plane in a concentric manner about the axis (X-X) of rotation of the wheel (14), the average radial distance between the rotating antenna (74) and the fixed antenna (78) exceeding 2 mm.

2. Wheel arrangement according to claim 1, characterized in that the average radial distance between the rotating antenna (74) and the fixed antenna (78) is substantially equal to 5 mm.

3. Wheel arrangement according to claim 1, characterized in that the fixed antenna (78) extends around the rotating antenna (74).

4. Wheel arrangement according to claim 1, characterized in that it comprises an auxiliary device (30) located inside the wheel spindle.

5. Wheel arrangement according to claim 4, characterized in that the auxiliary device (30) comprises a rotary member (34) and in that it comprises means (36) for the connection in rotation of the rotary member (34) and the wheel (14), which means extend generally along the axis of rotation of the wheel, through the rotating antenna (74) and the fixed antenna (78).

6. Wheel arrangement according to claim 5, characterized in that the means (36) for connection in rotation comprise a rotating core (50, 54, 80) which is fixedly joined to the wheel (14) and which is engaged through the spindle (12), and in that the rotating antenna (74) is carried by the rotating core (50, 54, 80) and is fixed for rotation therewith.

7. Wheel arrangement according to claim 5, characterized in that the connecting means (36) comprise a mechanism (56) for coupling in rotation the wheel and the rotary member (34) of the auxiliary device (32), which coupling means are suitable for compensating for any axial offsetting between the wheel (14) and the rotary member (34).

8. Wheel arrangement according to claim 4, characterized in that the auxiliary device comprises a tachometer (32).

* * * * *